(12) United States Patent
Starodubov et al.

(10) Patent No.: US 8,111,451 B2
(45) Date of Patent: Feb. 7, 2012

(54) MOPA SEED SOURCE WITH WAVELENGTH CONTROL FOR RESONANT FREQUENCY CONVERSION

(76) Inventors: Dmitry Starodubov, Dudley, MA (US); Yuri Grapov, Sutton, MA (US); Ning Liu, Charlton, MA (US)

( * ) Notice: Subject to any disclaimer, the term of this patent is extended or adjusted under 35 U.S.C. 154(b) by 23 days.

(21) Appl. No.: 12/534,642

(22) Filed: Aug. 3, 2009

(65) Prior Publication Data

US 2011/0026102 A1    Feb. 3, 2011

(51) Int. Cl.
*G02F 1/35* (2006.01)
(52) U.S. Cl. ............... 359/326; 372/22; 359/328
(58) Field of Classification Search .......... 359/326–332; 372/21–22
See application file for complete search history.

(56) References Cited

U.S. PATENT DOCUMENTS

| | | | |
|---|---|---|---|
| 5,422,897 A | 6/1995 | Wyatt et al. | |
| 5,774,484 A | 6/1998 | Wyatt et al. | |
| 5,974,059 A * | 10/1999 | Dawson | 372/6 |
| 6,763,042 B2 | 7/2004 | Williams et al. | |
| 7,327,909 B2 | 2/2008 | Marceau et al. | |
| 7,593,440 B2 * | 9/2009 | Spinelli et al. | 372/22 |
| 7,606,273 B2 * | 10/2009 | Zhu et al. | 372/6 |
| 2009/0010288 A1 * | 1/2009 | Keaton et al. | 372/25 |

OTHER PUBLICATIONS

N. Y. Voo and M. Ibsen, Multiple phase-shift all-fibre DFB lasers, University of Southhampton.

* cited by examiner

*Primary Examiner* — Daniel Petkovsek

(57) ABSTRACT

A method and system for converting one frequency into another include a MOPA configuration radiating a light at a first frequency which is coupled into a frequency conversion unit. Further included are a control unit operative to monitor the other frequency and a pump unit operative to vary its output power provided that the monitored frequency does not substantially match a reference value stored in the control unit. The output power of the pump unit varies while the master oscillator scans its cavity in search for the desired resonant frequency.

15 Claims, 2 Drawing Sheets

MOPA SEED SOURCE WITH WAVELENGTH CONTROL FOR RESONANT FREQUENCY CONVERSION

BACKGROUND OF THE DISCLOSURE

1. Field of the Disclosure

The present disclosure relates to nonlinear frequency conversion laser systems. In particular, the disclosure relates to a method and device for adjusting the output frequency of the seed source integrated into a Master Oscillator Power Amplifier (MOPA) fiber laser system.

2. Prior Art Discussion

Fiber lasers are frequently used to converts the radiation at one wavelength into another, different wavelength. For example, the infrared radiation (IR) can be converted into visible light which is used in multiple applications. The efficient conversion of IR into visible light can be effectively realized by utilizing a frequency doubling crystal in an external resonator as disclosed in U.S. Pat. No. 6,763,042 fully incorporated herein by reference.

A variety of fiber laser applications are in need for, among others, the single mode (SM) operation, narrow optical linewidth, and low noise performance as taught by U.S. Pat. No. 7,327,909 fully incorporated herein by reference. This can be attained by a known optical schematic including, in its basic configuration, a single frequency seed laser. The practical implementation of such radiation includes distributed feedback (DFB) fiber lasers, i.e., lasers which operate in a single resonator mode, incorporated in a MOPA configuration. In the MOPA configuration, a single-frequency seed DFB laser radiates light at a first wavelength; the lazed light is then amplified by a fiber amplifier. The amplified light is further coupled into a resonator containing nonlinear crystal which converts the first wavelength into the desired one as disclosed in U.S. Pat. No. 6,763,042.

The above-discussed optical system operates in the desired manner provided that the first wavelength of SM radiation at the output of the seed laser should substantially match its resonant frequency. Various approaches used for the adjustment of the resonant frequency are known.

The insufficiency of the resonant frequency adjustment has been noted and dealt with. Hence several techniques are used for controlling the output frequency of the single frequency seed laser as taught in U.S. Pat. No. 7,327,909 fully incorporated herein by reference. The configuration of the single frequency fiber laser basically includes an active, i.e., doped fiber having a phase-shift fiber grating which is written in the fiber core. When the single frequency laser is pumped at the desired wavelength, it becomes a single frequency light source.

One of the techniques used for changing the wavelength of single frequency laser, defined by its grating, is based on the controlled application of mechanical strain to the region of the fiber including the grating. The applied tension or compressed forces cause changes of not only the fiber's geometrical dimensions, but also of the refractive index of the fiber. As a consequence, the frequency of the grating, and, therefore, resonant frequency of MOPA can be controllably changed. The other technique includes the application of thermal stress to the fiber of the single frequency seed source. Similarly to a mechanical stress, a thermal stress affects the fiber's dimensions and refractive index and, thus, the resonant frequency. One of the issues associated with both of the techniques includes a relatively slow response of the treated active fiber. In the field, when frequency changes should be made in a fraction of second, the above techniques may be associated with seconds and even minutes. Still another issue relates to the reliability of the DFB laser. The fiber is a delicate, easily damaged configuration which, as a result of numerous thermo-mechanical stresses, may have a relatively short lifetime.

The parameters of DFB lasers may be changed by altering a pump power. In particular, controllable fluctuations of the pump power cause change of the output power and central wavelength of the DFB laser. The effects pump power modulation may have on a standard single-shift DFB laser include rapid changes of the laser core's refractive index due to the high intensity in the laser cavity in addition to the output power change. See Y. Voo and M Ibsen "*Multiple phase-shift all fibre DFB lasers*", Optoelectronics research Centre, University of Southampton SO17 BJ, UK (2006). The paper is fully incorporated herein by reference. As a consequence, the relative central wavelength shift is increased. The wavelength shift and DFB output power change, however, are detrimental to the desired operation of all fiber DFB lasers and can be reduced by configuring these lasers as a multiple phase-shift DFB laser.

A need, therefore, exists for a resonant frequency conversion system utilizing MOPA fiber laser unit with a DFB seed laser which is characterized by a rapid wavelength shift in search for a resonant frequency while avoiding the issues that may be associated with the known prior art.

A further need exists for a method for controllably tuning the frequency of the MOPA in the disclosed resonant frequency conversion system.

SUMMARY OF THE INVENTION

These needs are met by a laser system configured to convert one wavelength into another by controlling a pump power coupled into a single frequency seed fiber laser. Accordingly, the present disclosure utilizes the effect—wavelength shift—taught by the known prior art as parasitic.

Within the context of the disclosure, of course, a rapid wavelength shift is the desirable outcome. As a consequence, the disclosed method and laser system for adjusting the wavelength shift of the seed laser are based on the known pump power change configuration. However, in contrast to the known prior art, the disclosed system avoids other detrimental effects, such as the instability of power at the output of DFB fiber laser which was considered to be a detriment in the known prior art.

The disclosed system is thus configured, among others, with a resonator and a MOPA unit including a DFB fiber seed laser and a fiber amplifier. The adjustment of the resonant frequency is realized by controllably changing a pump power which is coupled into the DFB. To provide a stable power outcome of radiation lazed by the MOPA, the fiber amplifier operates in a saturated mode. Therefore, the output power of the MOPA remains substantially constant despite controllable changes of pump power.

The disclosed method utilizes the concept underlying the above-discussed system. In particular, the method provides for controllably changing a pump power in response to a signal generated by a controller which executes a software operative to compare the detected wavelength at the output of the frequency conversion unit to the desired resonant frequency.

BRIEF DESCRIPTION OF THE DRAWINGS

The above and other features and advantages will become more readily apparent from the following specific description taken in conjunction with the accompanying drawings, in which.

SPECIFIC DESCRIPTION

Figure 1:
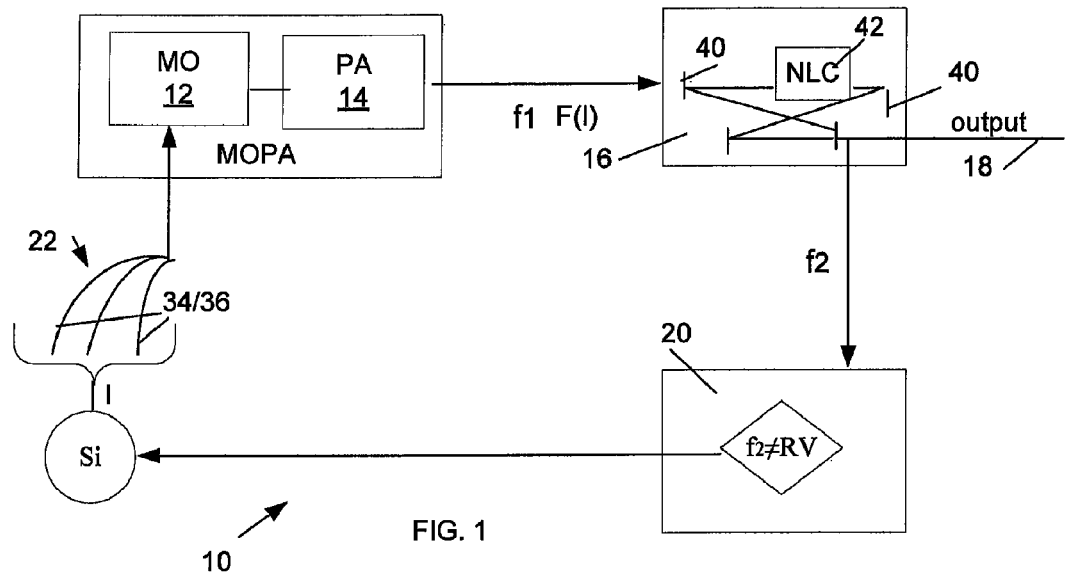
FIG. 1 is a diagrammatic view of the disclosed system.

Reference will now be made in detail to the disclosed method and system. Wherever possible, same or similar reference numerals are used in the drawings and the description to refer to the same or like parts or steps. The drawings are in simplified form and are far from precise scale.

FIG. 1 diagrammatically illustrates a disclosed system 10. The system 10 includes a MOPA unit provided with a master oscillator—DBF laser light source 12, which radiates light output at a controllable frequency $f_1$, and a power amplifier 14 coupled to light source 12. The light processed in PA 14 is emitted therefrom at the same light source frequency $f_1$ and may be amplified, as disclosed below. Upon propagation through free space, the light is coupled into a non-linear resonator 16 configured to convert (double)frequency $f_1$ into frequency $f_2$ in the known manner.

During operation of system 10, it is often necessary to adjust frequency $f_1$ of light source 12 to a resonant frequency thereof if an output 18 of system 10 is not radiated at the desired output frequency $f_2$. The deviation of the output frequency $f_2$ from the desired reference value is monitored by a controller 20 capable of executing computer readable media which allows for determining frequency $f_2$. If the determined frequency does not match the stored reference value RV, controller 20 generates a signal coupled into a pump laser unit 22 which is operative to pump light source 12. Upon receiving the signal from controller 20, pump unit 22 is operative to modify its output pump power by changing applied current I.

The power changes of the pump causes a wavelength shift of light source 12. The tuning of light source 12, which thus "scans the entire cavity resonance envelope" (as taught by U.S. Pat. No. 6,763,042, col. 4, lines 25-26), continues until frequency $f_1$ of light source 12 corresponds to the resonant frequency. The latter can be easily identified by determining frequency $f_2$. If the determined frequency at the output of converter 16 matches the reference value, no signal is generated by controller 20. Otherwise, controller 20 generates a signal modulating the output pump power of pump unit 22. The pump unit 22 may be comprised of a plurality of SM laser diodes 34. Alternatively, pump unit 22 may be configured with a plurality of SM fiber lasers 36 combined together by a combiner. The pumping configurations may include both end and side pumping schemes, as readily understood by one of ordinary skills in the laser arts.

The power adjustment of the active fiber of light source 12 allows rapid tuning over a wide frequency range at a rate which is substantially greater than the tuning rate if either thermal or mechanical or a combination of these is used. However, the active fiber, one of the components of the DBF laser, is not nearly as affected as a fiber exposed to thermomechanical stresses as taught by the prior art.

The pump power fluctuations affect not only the stability of the wavelength shift of DFB laser source 12, but also the radiation power at the output of source 12. The latter, however, is a detriment to the desired operation of system 10, as known to one of ordinary skills in the fiber laser arts. Accordingly, to remedy this undesirable effect, power amplifier 14 is configured to operate in a saturated mode. In other words, even if the pump power substantially changes causing the fluctuation of the light source radiation in response to the signal from controller 20, the radiation power at the output of amplifier 14 of the MOPA output will remain substantially uniformly stable.

Figure 2:
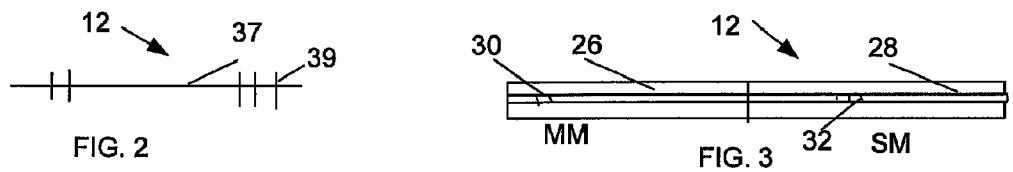
FIG. 2 illustrates one embodiment of a light source in accordance with the disclosure.
Figure 3:
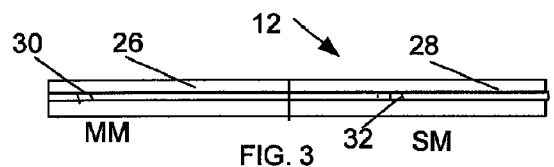
FIG. 3 illustrates a further embodiment of the light source configured in accordance with the disclosure.

Referring to FIGS. 2 and 3 in addition to FIG. 1, laser light source 12 of FIG. 2 includes an active fiber 37 having a core which is provided with fiber Bragg gratings 38 doped with one or more rare-earth elements which include, but not limited to Er, Yb, Th, Nd, Ho, Ce and other optically active elements. A particular dopant is selected based on the desired wavelength ranging from about 400 nm to about 1700 nm. Alternatively, if higher powers are desirable, laser light source 12 may be configured with a combination of multimode fiber 26 which is directly spliced to a SM fiber and has a mode field diameter (MFD) substantially match the MFD of SM fiber 28. (See U.S. Pat. Nos. 5,422,897 and 5,774,484 both fully incorporated herein by reference and commonly owned with the present application) Gratings 30 and 32 are written in respective fibers 26 and 28, as shown in FIG. 4.

The light source 12 is coupled to amplifier 14 operating in a saturated mode and lazing the MOPA's output which impinges upon non-linear resonator 16. Shown is an exemplary schematic, resonator 16 may have three or more reflective elements 40 placed within the resonant cavity such that the optical axis follows a folded path that is always at non-normal incidence to the cavity mirrors. A nonlinear crystal 42 is introduced along the upstream of the light path within the resonant cavity and configured to convert frequency $f_1$ of the MOPA's output into frequency $f_2$. The nonlinear optical crystal 42 may be selected, among others, from the group consisting of potassium titanyl phosphate (KTP), potassium titanyl arsenate (KTA), lithium triborate (LBO), lithium niobate (LN), beta-barium borate (BBO), periodically-poled KTP, periodically-poled KTA, and periodically-poled LN. As discussed above, the resonant mode is preferably, but not necessarily, a fundamental transverse mode.

Figure 4:
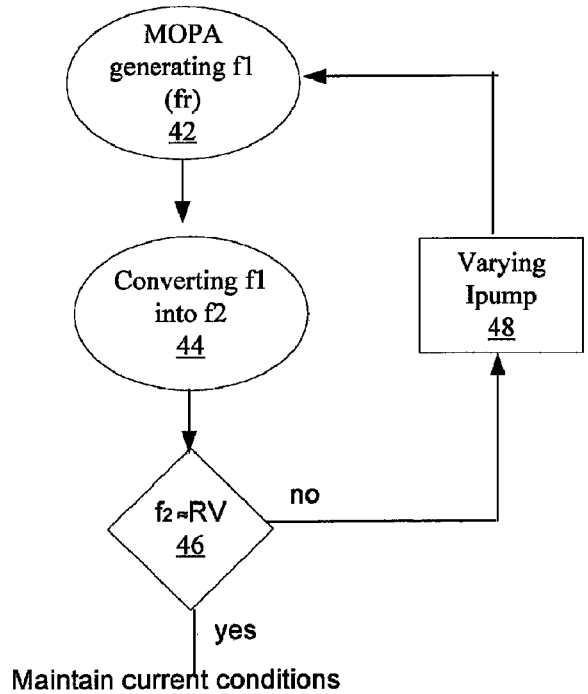
FIG. 4 is a flow chart illustrating the disclosed method.

Turning to FIG. 4 and summarizing the above discussion, a flow chart represents the disclosed method. In particular, the method starts with generating a MOPA's output in a step 42 in response to a given pump power. The MOPA's output is incident upon resonator 16 configured to double the MOPA's frequency and halve the wavelength. For example, useful light sources include doubling the 532 nm wavelength or 1310 nm wavelength or 980 nm wavelength. Part of the doubled frequency is routed towards and determined by controller 20 in the known manner illustrated by a step 44. Upon comparison of the determined frequency to the reference value in a step 46, if the compared frequencies substantially match, no changes are introduced in the existing setup. However, if the determined frequency does not substantially match reference value, controller 20 generates a signal modulating the value of pump current in a step 48. The process continues until the resonant frequency is determined.

Figure 5:
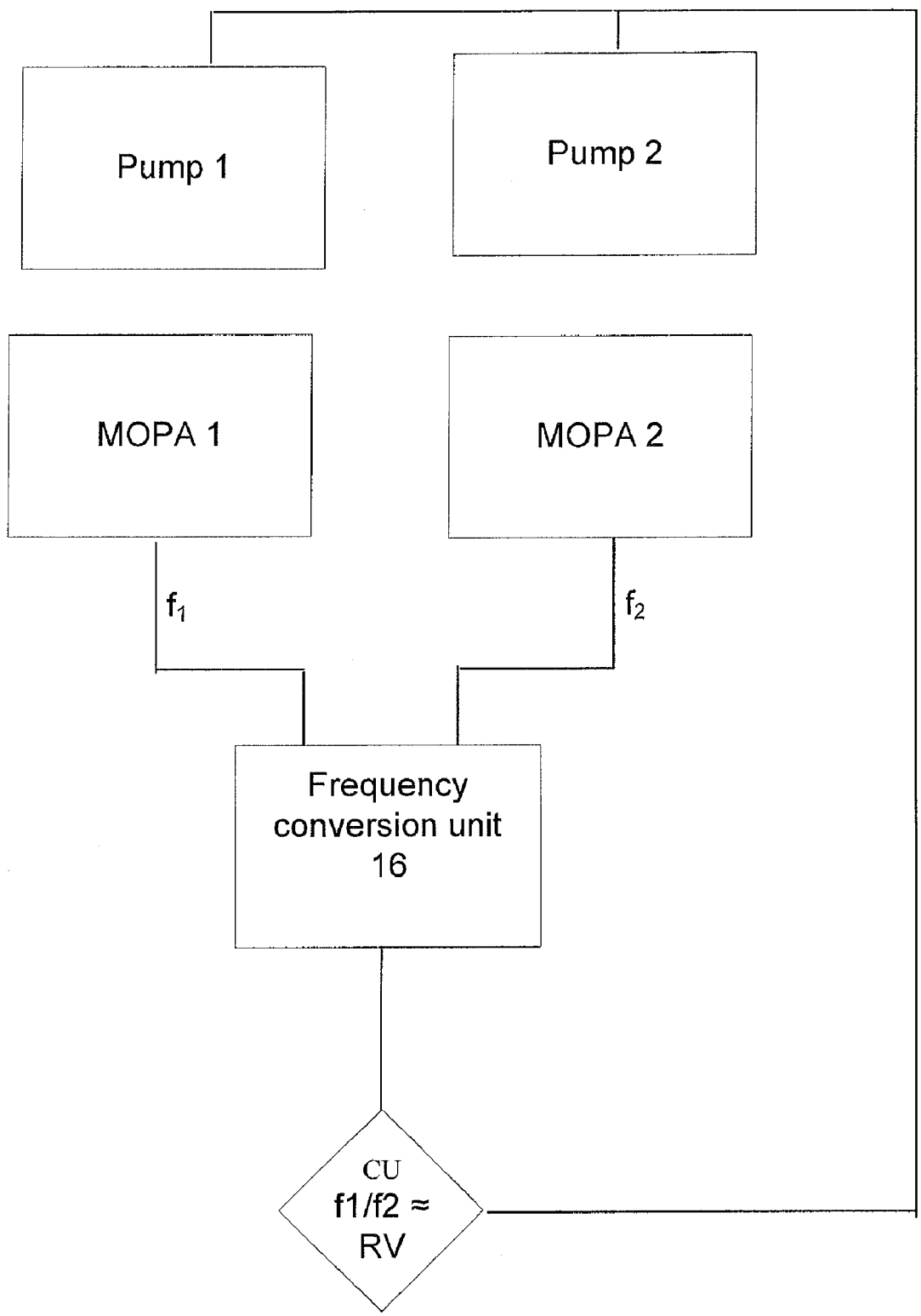
FIG. 5 illustrates an optical schematics of a further embodiment of the disclosed system.

Referring FIG. 5, slightly modified system 10 may, in addition to a frequency doubling operation disclosed above, realize a frequency mixing operation. To accomplish this operation two separate pump units and, of course, two MOPAs should be coupled to nonlinear resonator unit 16. Using two laser sources may produce red, blue, or green visible laser light. For example, resonantly mixing 1550 nm and 1064 nm light gives the resultant wavelength of 630.9 nm (red light). Also, doubling light at 1550 nm resulting in light having 775 nm wavelength and then resonantly mixing with 1064 nm light results in light having 448.4 nm wavelength (blue). Also, treating light at 1064 nm results in light having 532 nm wavelength (green). The above recited wavelengths represent commonly used and readily available light sources. Other wavelengths within the range of about 400 to 1700 nm are also considered within the scope of this invention. The doubling and mixing within the present invention is very versatile and applies to both types of phase matching. Thus, using the uniform red, blue, and green light sources of the present invention in producing color laser displays would be desirable.

It will be apparent to those skilled in the art that various modifications and variations can be made in the presently disclosed system and method. Thus, it is intended that the present disclosure cover the modifications and variations of this disclosure provided they come within the scope of the appended claims and their equivalents.

The invention claimed is:

1. A laser system operative to emit an output light at a desired frequency, comprising:
   a master oscillator power amplifier ("MOPA"). fiber unit configured with a master oscillator operative to generate a signal light at a first frequency from a band of frequencies, which has a resonant frequency, and a power amplifier operative to amplify the signal light;
   a frequency conversion unit receiving the amplified signal light at the first frequency and operative to convert the first frequency so as to radiate the output light at a second frequency, the second frequency substantially matching the desired frequency in response to receiving the amplified signal light at the resonant frequency;
   a control unit coupled to the frequency conversion unit and operative to compare the converted second frequency to a reference value which corresponds to the desired frequency, the control unit outputting a control signal if the second frequency is not substantially matched to the reference value; and
   a pump unit coupled to the master oscillator and to the control unit and radiating a pump light coupled into the master oscillator at a third frequency, the control signal being coupled into the pump unit so as to adjust a power of the pump light until the first frequency of the signal light substantially matches the resonant frequency.

2. The system of claim 1, wherein the fiber power amplifier is configured to operate in a saturation mode so that a power of the signal light coupled into the frequency conversion unit remains substantially constant regardless of variation of the pump power.

3. The system of claim 1, wherein the frequency conversion unit includes a ring configuration provided with a plurality of mirrors which define a stretch of a light path of the signal light within the frequency conversion unit, and a nonlinear crystal located between the mirrors.

4. The laser system of claim 3, wherein the nonlinear optical crystal is selected from the group consisting of potassium titanyl phosphate (KTP), potassium titanyl arsenate (KTA), lithium triborate (LBO), lithium niobate (LN), beta-barium borate (BBO), periodically-poled KTP, periodically-poled KTA, and periodically-poled LN.

5. The system of claim 1, wherein the fiber master oscillator is configured as a tunable distributed feedback laser light source.

6. The system of claim 1, wherein the master oscillator is configured with a multimode fiber emitting the signal light at the first frequency, and a single mode fiber coupled to the MM fiber lazing the input light in substantially single mode at the first frequency.

7. The system of claim 6, wherein the master oscillator further comprises frequency selective gratings.

8. The laser system of claim 6, wherein the multimode fiber is configured to support the a fundamental mode at the resonant frequency and has a mode field diameter substantially matching the single mode of the single mode fiber.

9. The laser system of claim 1, wherein the signal light is radiated at a wavelength selected from the band ranging from about 400 nm to about 1700 nm.

10. The laser system of claim 1 further comprising:
    a second MOPA configured to emit radiation at a fourth frequency coupled into the frequency conversion unit, wherein the first and fourth frequencies are mixed up to produce a resultant frequency, and
    a second pump unit radiating a second pump light at a fifth frequency coupled into a master oscillator of the second MOPA, wherein the control unit is configured to produce a second signal to adjust a current of the second pump so as to vary a power of the second pump unit until the resultant frequency substantially matches a desired one.

11. A method of operating a laser system configured to emit an output signal at a desired frequency comprising the steps of:
    radiating a light signal lazed by a master oscillator power amplifier ("MOPA") at a first frequency belonging to a band of frequencies which has a resonant frequency;
    converting the first frequency into a second frequency in a frequency conversion unit;
    comparing the second frequency to a reference corresponding to the desired frequency and, if the second frequency does not substantially match the reference value, generating a control electrical signal; and
    coupling the control electrical signal into a pump which generates a pump light delivered to the MOPA, thereby controllably varying a pump current so as to adjust a power of the pump light until the first frequency substantially matches the resonant frequency of a master oscillator of the MOPA.

12. The method of claim 11 further comprising simultaneously with controllably varying the power, continuously maintaining a power amplifier of the MOPA in a saturated mode.

13. The method of claim 11, wherein the conversion includes frequency doubling.

14. The method of claim 11, wherein the conversion includes frequency mixing of the first frequency and a third frequency, which is generated by a second MOPA in response to a second pump light radiated from a second pump, and comparing a resultant mixed frequency to a second reference value so as to generate a signal modulating the pump power of a component selected from the group consisting of the first pump, second pump and a combination of these.

15. The method of claim 11, wherein the signal light is radiated at a wavelength within the band varying from about 400 to about 1700 nm.

* * * * *